US010852847B2

(12) United States Patent
Hesch et al.

(10) Patent No.: US 10,852,847 B2
(45) Date of Patent: Dec. 1, 2020

(54) CONTROLLER TRACKING FOR MULTIPLE DEGREES OF FREEDOM

(71) Applicant: GOOGLE LLC, Mountain View, CA (US)

(72) Inventors: Joel Hesch, Mountain View, CA (US); Shiqi Chen, Mountain View, CA (US); Johnny Lee, Mountain View, CA (US); Rahul Garg, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 3 days.

(21) Appl. No.: 15/660,216

(22) Filed: Jul. 26, 2017

(65) Prior Publication Data

US 2019/0033988 A1   Jan. 31, 2019

(51) Int. Cl.
| | | |
|---|---|---|
| *G06F 3/0346* | (2013.01) |
| *G06T 7/73* | (2017.01) |
| *G06F 3/0354* | (2013.01) |
| *G06F 3/01* | (2006.01) |

(52) U.S. Cl.
CPC .......... *G06F 3/0346* (2013.01); *G06F 3/011* (2013.01); *G06F 3/03547* (2013.01); *G06T 7/74* (2017.01); *G06T 2207/10028* (2013.01); *G06T 2207/30196* (2013.01); *G06T 2207/30204* (2013.01)

(58) Field of Classification Search
CPC .... G06F 3/0346; G06F 3/03547; G06F 3/011; G06T 7/74; G06T 2207/30204; G06T 2207/30196; G06T 2207/10028
See application file for complete search history.

(56) References Cited

U.S. PATENT DOCUMENTS

| | | | |
|---|---|---|---|
| 8,300,025 B2 | 10/2012 | Katayama | |
| 2006/0197750 A1* | 9/2006 | Kerr | G06F 1/1626 345/173 |
| 2010/0328344 A1* | 12/2010 | Mattila | G06F 1/1626 345/633 |
| 2013/0215060 A1 | 8/2013 | Nakamura | |
| 2015/0002734 A1* | 1/2015 | Lee | H04N 5/3532 348/367 |
| 2016/0364013 A1* | 12/2016 | Katz | G06F 3/0304 |
| 2016/0378204 A1 | 12/2016 | Chen et al. | |

OTHER PUBLICATIONS

International Search Report and Written Opinion dated Jul. 3, 2018 for corresponding International Application No. PCT/US2018/027662, 14 pages.
International Preliminary Report on Patentability dated Feb. 6, 2020 for corresponding International Application No. PCT/US2018/027662, 10 pages.
English Translation of Taiwanese Office Action dated May 10, 2020 for corresponding TW Application No. 107112664, 5 pages.

* cited by examiner

*Primary Examiner* — Andrew Sasinowski

(57) ABSTRACT

A method for controller tracking with multiple degrees of freedom includes generating depth data at an electronic device based on a local environment proximate the electronic device. A set of positional data is generated for at least one spatial feature associated with a controller based on a pose of the electronic device, as determined using the depth data, relative to the at least one spatial feature associated with the controller. A set of rotational data is received that represents three degrees-of-freedom (3DoF) orientation of the controller within the local environment, and a six degrees-of-freedom (6DoF) position of the controller within the local environment is tracked based on the set of positional data and the set of rotational data.

15 Claims, 6 Drawing Sheets

CONTROLLER TRACKING FOR MULTIPLE DEGREES OF FREEDOM

BACKGROUND

Motion tracking allows a device to understand its motion with respect to position and orientation as it moves through an area. Motion tracking is useful in virtual reality applications such as gaming which allows a user to explore a virtual world from a fixed viewpoint. The tracked motion can be characterized by how many degrees of freedom are possible in movement, for example, either three degrees of freedom (3DoF) or six degrees of freedom (6DoF). In virtual reality applications, tracking motion with respect to 6DoF can provide an improved user experience because the tracking captures both rotational movement and translational movement in the X, Y, and Z directions.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

FIGS. 1-8 illustrate various techniques for tracking one or more controllers in three-dimensional (3D) space by employing depth data to identify the position of the controllers. In the context of controller tracking, pose information may be used to support location-based functionality, such as virtual reality (VR) functionality, augmented reality (AR) functionality, visual odometry or other simultaneous localization and mapping (SLAM) functionality, and the like. The term "pose" is used herein to refer to either or both of position and orientation of the electronic device within the local environment. In some embodiments, the electronic device includes two or more imaging cameras and a depth sensor disposed at a surface. The depth sensor may be used to determine the distances of spatial features of objects in the local environment and their distances from the electronic device. Similarly, the imaging cameras may be used to capture depth imagery to be analyzed to calculate the distances of objects in the local environment from the electronic device. In some embodiments, the electronic device is associated with a hand-held controller that includes an inertial measurement unit (IMU) for determining the rotational orientation of the hand-held controller within the local environment.

In some embodiments, the electronic device generates depth data at a depth sensor based on the local environment proximate the electronic device. A set of positional data is generated based on a pose of the electronic device relative to at least one spatial feature associated with a controller. In various embodiments, the at least one spatial feature includes anatomical features, markers, and/or gestures associated with the hand-held controller. For example, the at least one spatial feature can include a thumb of the user's hand that is grasping the hand-held controller. Based on a set of rotational data representing three degrees-of-freedom (3DoF) orientation of the controller within the local environment, the electronic device tracks a six degrees-of-freedom (6DoF) position of the controller within the local environment based on the set of positional data and the set of rotational data.

Figure 1:
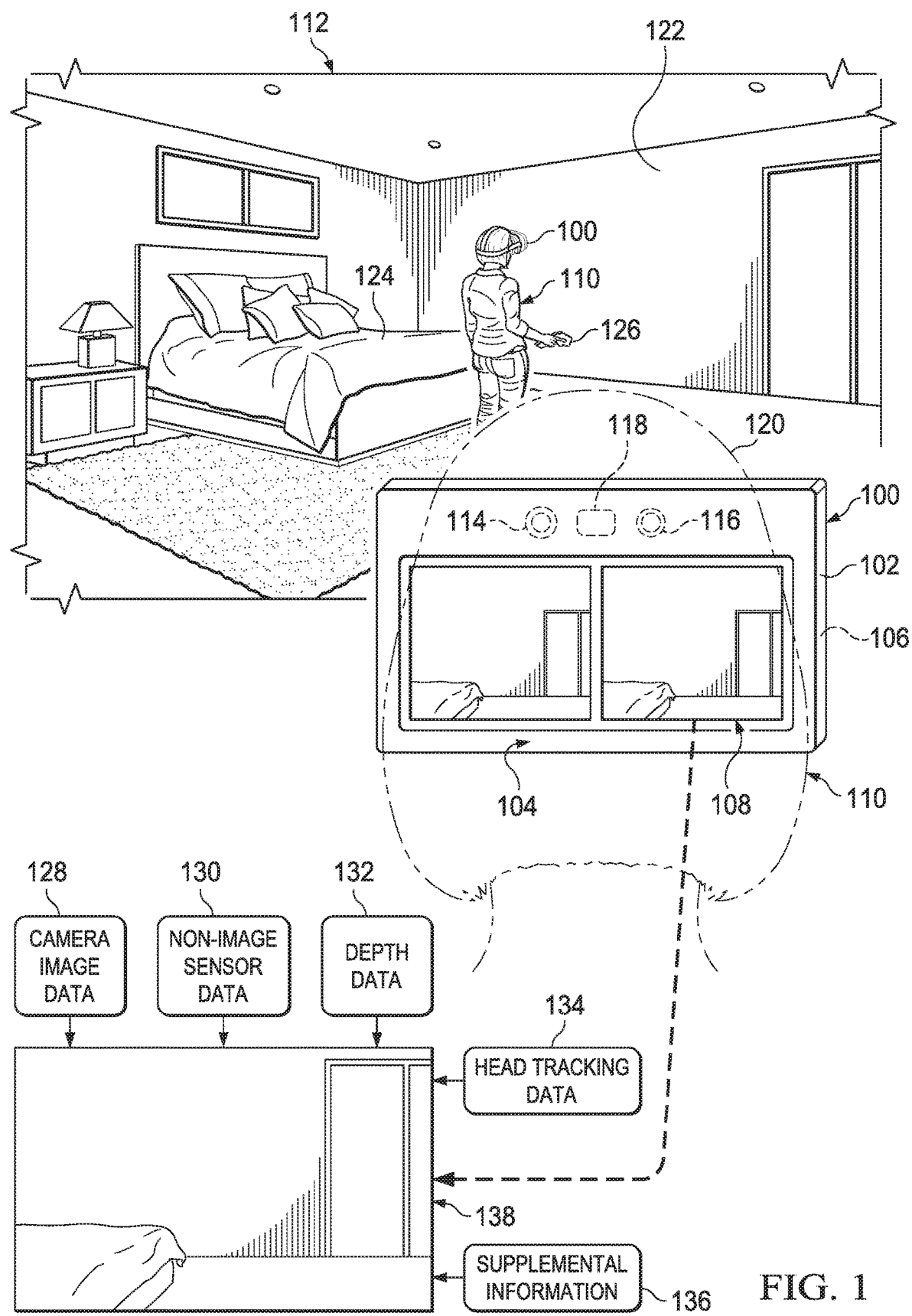
FIG. 1 is a diagram illustrating an electronic device configured to support controller tracking in AR or VR environments in accordance with at least one embodiment of the present disclosure.

FIG. 1 illustrates an electronic device 100 configured to support controller tracking with multiple degrees of freedom in accordance with at least one embodiment of the present disclosure. The electronic device 100 can include a portable user device, such as head mounted display (HMD), a tablet computer, computing-enabled cellular phone (e.g., a "smartphone"), a notebook computer, a personal digital assistant (PDA), a gaming console system, and the like. In other embodiments, the electronic device 100 can include a fixture device, such as medical imaging equipment, a security imaging sensor system, an industrial robot control system, a drone control system, and the like. For ease of illustration, the electronic device 100 is generally described herein in the example context of an HMD system; however, the electronic device 100 is not limited to the example implementations discussed herein.

In the depicted example, the electronic device 100 includes a housing 102 having a surface 104 opposite another surface 106. In the exemplary thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging cameras 114 and 116 and a depth sensor 118 disposed at the forward-facing surface 106. In one embodiment, the imaging camera 114 is implemented as a wide-angle imaging camera having a fish-eye lens or other wide-angle lens to provide a wider-angle view of the local environment 112 facing the surface 106. The imaging camera 116 is implemented as a narrow-angle imaging camera having a typical angle of view lens to provide a narrower angle view of the local environment 112 facing the surface 106. Accordingly, the imaging camera 114 and the imaging camera 116 are also referred to herein as the "wide-angle imaging camera 114" and the "narrow-angle imaging camera 116," respectively.

The wide-angle imaging camera 114 and the narrow-angle imaging camera 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via multiview image analysis. Similarly, a depth sensor 118 disposed on the surface 106 may be used to provide depth information for the objects in the local environment. The depth sensor 118, in one embodiment, uses a modulated light projector to project modulated light patterns from the forward-facing surface 106 into the local environment 112, and uses one or both of imaging cameras 114, 116 to capture reflections of the modulated light patterns as they reflect back from objects in the local environment 112. These modulated light patterns can be either spatially-modulated light patterns or temporally-modulated light patterns. The captured reflections of a modulated light flash are referred to herein as "depth images" or "depth imagery." The depth sensor 118 then may calculate the depths of the objects, that is, the distances of the objects from the electronic device 100, based on the analysis of the depth imagery. The resulting depth data obtained from the depth sensor 118 may be used to calibrate or otherwise augment depth information obtained from multiview analysis (e.g., stereoscopic analysis) of the image data captured by the imaging cameras 114, 116.

Alternatively, the depth data from the depth sensor 118 may be used in place of depth information obtained from multiview analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 118.

One or more of the imaging cameras 114, 116 may serve other imaging functions for the electronic device 100 in addition to capturing imagery of the local environment 112. To illustrate, the imaging cameras 114, 116 may be used to support visual telemetry functionality, such as capturing imagery to support position and orientation detection. Further, in some embodiments, an imaging sensor (not shown) disposed at the user-facing surface 104 may be employed for tracking the movements of the head of the user 110 or for facial recognition, and thus providing head tracking information that may be used to adjust a view perspective of imagery presented via the display 108. The electronic device 100 also may rely on non-image information for pose detection. This non-image information can be obtained by the electronic device 100 via one or more non-image sensors (not shown in FIG. 1), such as a gyroscope or ambient light sensor. The non-image sensors also can include user interface components, such as a keypad (e.g., touchscreen or keyboard), microphone, mouse, and the like.

The electronic device 100 captures imagery of the local environment 112 via one or both of the imaging cameras 114, 116, modifies or otherwise processes the captured imagery, and provides the processed captured imagery for display on the display 108. The processing of the captured imagery can include, for example, addition of an AR overlay, conversion of the real-life content of the imagery to corresponding VR content, and the like. As shown in FIG. 1, in implementations with two imaging sensors, the imagery from the left side imaging camera 114 may be processed and displayed in left side region of the display 108 concurrent with the processing and display of the imagery from the right-side imaging camera 116 in a right side region of the display 108, thereby enabling a stereoscopic 3D display of the captured imagery.

In addition to capturing imagery of the local environment 112 for display with AR or VR modification, in at least one embodiment the electronic device 100 uses the image sensor data and the non-image sensor data to determine a relative pose (that is, position and/or orientation) of the electronic device 100, that is, a pose relative to the local environment 112. This non-image information can be obtained by the electronic device 100 via one or more non-image sensors (not shown in FIG. 1), such as a gyroscope or ambient light sensor. This relative pose information may be used by the electronic device 100 in support of simultaneous location and mapping (SLAM) functionality, visual odometry, or other location-based functionality. The non-image sensors also can include user interface components, such as a keypad (e.g., touchscreen or keyboard), microphone, mouse, and the like. The non-image sensor information representing a state of the electronic device 100 at a given point in time is referred to as the "current context" of the electronic device for that point in time. This current context can include explicit context, such as the relative rotational orientation of the electronic device 100 or the ambient light from the local environment 112 incident on the electronic device 100.

In operation, the electronic device 100 uses the image sensor data and the non-image sensor data to determine the relative pose of the electronic device 100. The relative pose information may support the generation of AR overlay information that is displayed in conjunction with the captured imagery, or in the generation of VR visual information that is displayed in representation of the captured imagery. As an example, the electronic device 100 can map the local environment 112 and then use this mapping to facilitate the user's navigation through a VR environment, such as by displaying to the user an indicator when the user navigates in proximity to and may collide with an object in the local environment.

To this end, the determination of the relative pose may be based on the detection of spatial features in image data captured by one or more of the imaging cameras 114, 116 and the determination of the pose of the electronic device 100 relative to the detected spatial features. To illustrate, in the depicted example of FIG. 1 the local environment 112 includes a bedroom that includes a wall 122, a bed 124, and a hand-held controller 126. The user 110 has positioned and oriented the electronic device 100 so that the imaging cameras 114, 116 capture camera image data 128 that includes these spatial features of the bedroom. In this example, the depth sensor 118 also captures depth data 132 that reflects the relative distances of these spatial features relative to the pose of the electronic device 100. In some embodiments, a user-facing imaging camera (not shown) captures image data representing head tracking data 134 for the pose of the head 120 of the user 110. Non-image sensor data 130, such as readings from a gyroscope, a magnetometer, an ambient light sensor, a keypad, a microphone, and the like, also is collected by the electronic device 100 in its pose.

From this input data, the electronic device 100 can determine its pose without explicit absolute localization information from an external source. To illustrate, the electronic device 100 can perform multiview analysis of wide angle imaging camera image data and narrow angle imaging camera image data in the camera image data 128 to determine the distances between the electronic device 100 and the wall 122, the bed 124, and/or the hand-held controller 126. Alternatively, the depth data 132 obtained from the depth sensor 118 can be used to determine the distances of the spatial features. From these distances, the electronic device 100 can triangulate or otherwise infer its relative position in the bedroom represented by the local environment 112. As another example, the electronic device 100 can identify spatial features present in one set of captured image frames of the captured image data 128, determine the initial distances to these spatial features, and then track the changes in position and distances of these spatial features in subsequent captured imagery to determine the change in pose of the electronic device 100. In this approach, certain non-image sensor data, such as gyroscopic data or accelerometer data, can be used to correlate spatial features observed in one image frame with spatial features observed in a subsequent image frame. Moreover, the pose information obtained by the electronic device 100 can be combined with any of the camera image data 128, non-image sensor data 130, depth data 132, head tracking data 134, and/or supplemental information 136 to present a VR environment or an AR view of the local environment 112 to the user 110 via the display 108 of the electronic device 100. The supplemental information 136 includes, in some embodiments, inertial measurement unit (IMU) data captured at a IMU of the hand-held controller 126, which includes non-visual motion sensors such as one or more accelerometers, gyroscopes, and the like. The IMU data includes, for example, data indicative of real world linear acceleration of movement, orientation and gravitational forces based on devices of the IMU.

In the depicted example of FIG. 1, the electronic device 100 captures video imagery of a view of the local environment 112 via the imaging camera 116, determines a relative orientation/position of the electronic device 100 as described above and herein, and determine the pose of the user 110 within the bedroom. The electronic device 100 then can generate a graphical representation 138 representing, for example, an AR or VR environment. As the electronic device 100 moves relative to the previous view, the electronic device 100 updates the graphical representation 138 so as to reflect the changed perspective. Moreover, the head tracking data 134 can be used to detect changes in the position of the head 120 of the user 110 relative to the local environment 112, in response to which the electronic device 100 can adjust the displayed graphical representation 138 so as to reflect the changed viewing angle of the user 110. Further, as described below, the electronic device 100 could present a VR environment for display to the user 110 and, in response to receiving user input of movement within the local environment 112, the electronic device 100 can update a position of the user within the VR environment. With this information, the electronic device 100 can track movement of the user 110 and update the display of the graphical representation 138 to reflect changes in the pose of the user 100.

As another example, the electronic device 100 can be used to facilitate navigation in VR environments in which the determination of pose can include, for example, tracking the position of the hand-held controller 126. As illustrated, the user 110 holds one or more controllers such as the hand-held controller 126. In some embodiments, the hand-held controller 126 includes sensors such as gyroscopes and altimeters so as to capture three-degrees-of-freedom (3DoF) readings for enabling detection of the orientation of the hand-held controller 126. In other embodiments, the hand-held controller 126 includes an inertial measurement unit (IMU) (not shown) for capturing supplemental information 136, such as IMU data. The IMU data includes, for example, data indicative of real world linear acceleration of movement, orientation and gravitational forces based on devices of the IMU such as, without limitation, accelerometers and gyroscopes. Although the example of FIG. 1 illustrates use of a hand-held controller, those skilled in the art will recognize that the controller tracking described herein may be performed using hand-held devices of various form factors. For example, in other examples, the user may hold a mobile phone with an IMU. Similarly, in various other examples, the controller tracking as described herein may be performed on any hand-held object that is paired with an IMU and/or other sensors capable of capturing three-degrees-of-freedom (3DoF) readings for enabling detection of the orientation in 3D space.

The electronic device 100 uses image sensor data (e.g., camera image data 128), non-image sensor data (e.g., non-image sensor data 130 and depth data 132), and/or IMU data (e.g., supplemental information 136) to determine a pose (that is, position and/or orientation) of the hand-held controller 126 in three-dimensional (3D) space. In at least one embodiment, the electronic device 100 tracks the position of the hand-held controller 126 in reference to anatomical features, markers, and/or gestures associated with the hand-held controller 126. For example, as described below in the context of one embodiment, the electronic device 100 tracks the position of the user's thumb using captured image sensor data (e.g., camera image data 128), non-image sensor data (e.g., non-image sensor data 130 and depth data 132), and/or supplemental information 136. Tracking information for the user's thumb (i.e., position in 3D space based on forward/backward, up/down, and left/right translation of the user's thumb along three perpendicular axes) is combined with 3DoF rotational information of the hand-held controller 126 (i.e., changes in orientation through rotation about three perpendicular axes [yaw, pitch, and roll]) to achieve 6DoF tracking of the hand-held controller 126, as discussed herein.

Figure 2:
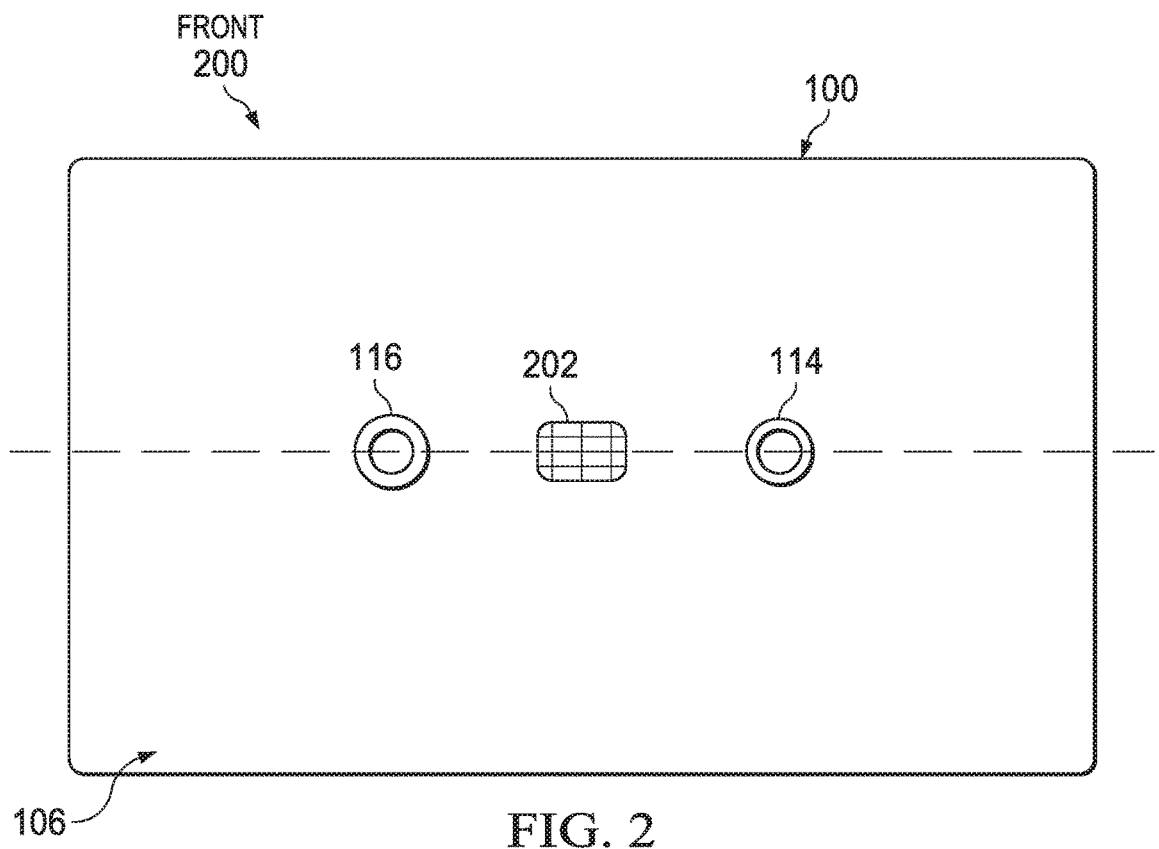
FIG. 2 is a diagram illustrating a front plan view of an electronic device implementing multiple imaging cameras and a depth sensor in accordance with at least one embodiment of the present disclosure.
Figure 3:
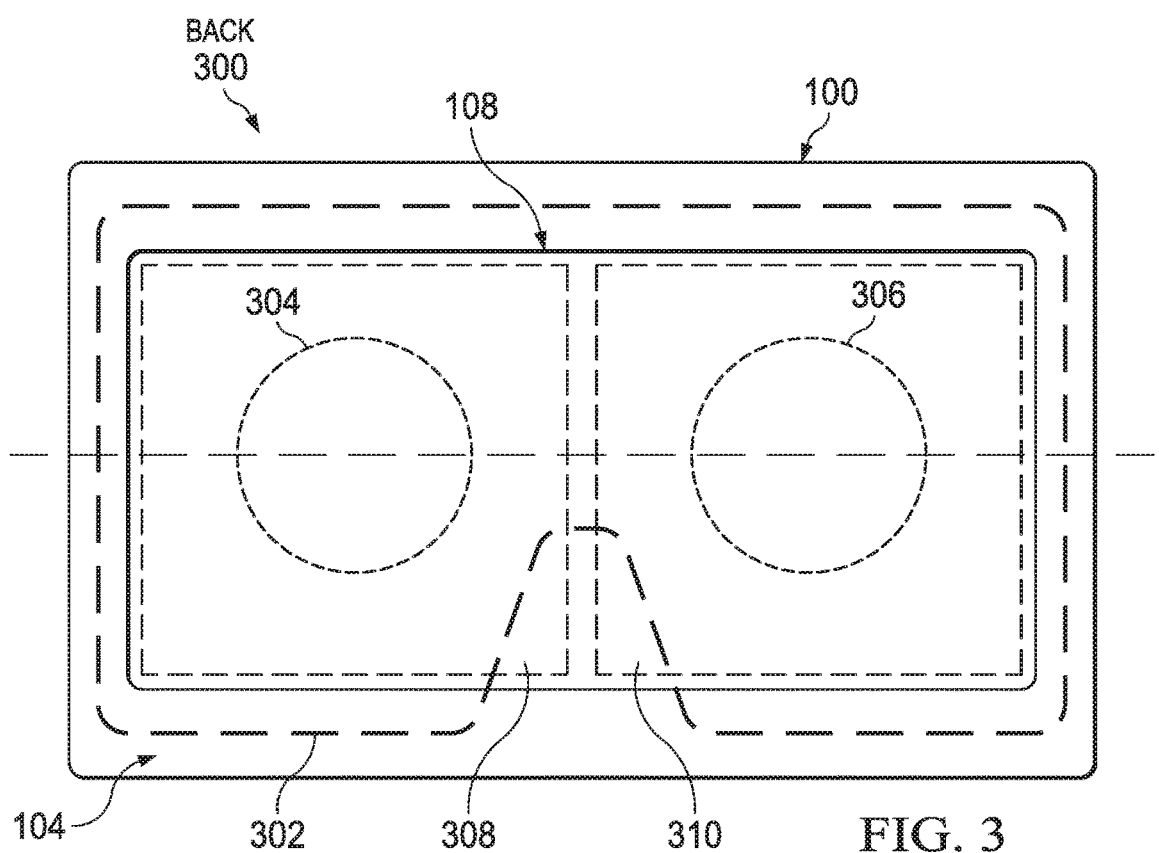
FIG. 3 is a diagram illustrating a back plan view of the electronic device of FIG. 2 in accordance with at least one embodiment of the present disclosure.

FIGS. 2 and 3 illustrate example front and back plan views of an example implementation of the electronic device 100 in a HMD form factor in accordance with at least one embodiment of the present disclosure. The electronic device 100 may be implemented in other form factors, such as a smart phone form factor, tablet form factor, a medical imaging device form factor, and the like, which implement configurations analogous to those illustrated.

As illustrated by the front plan view 200 of FIG. 2, the electronic device 100 can include the imaging cameras 114, 116, and a modulated light projector 202 of the depth sensor 118 disposed at the forward-facing surface 106. Although FIGS. 2 and 3 illustrate the imaging cameras 114, 116, and the modulated light projector 202 aligned along a straight line for the benefit of an example cross-section view in FIG. 4, in other embodiments the imaging cameras 114, 116 and the modulated light projector 202 may be offset relative to each other.

In at least one embodiment, and as described further herein, the electronic device HMD 100 includes a plurality of sensors to capture information about the pose (position and orientation) of the electronic device 100 and information about the pose of objects in the local environment 112 relative to the electronic device 100. For example, in at least one embodiment, the above-referenced sensors of the electronic device 100 include a depth camera to capture depth information for the local environment. Further, the electronic device 100 is configured to received IMU data captured at the hand-held controller 126 of FIG. 1, which provides information indicating rotational movement of the controller 126 as the user moves, for example, his hand. As described further herein, the electronic device 100 can perform 6DoF tracking of the hand-held controller based on positional information provided by the captured depth information (or in some embodiments, captured image- and non-image sensor data) and rotational movement information provided by the IMU, thereby extending 6DoF tracking to 3DoF controllers without the need for inclusion of additional sensors in the controller 126.

As illustrated by the back plan view 300 of FIG. 3, the electronic device 100 can include the display device 108 disposed at the surface 104, a face gasket 302 for securing the electronic device 100 to the face of the user 110 (along with the use of straps or a harness), and eyepiece lenses 304 and 306, one each for the left and right eyes of the user 110. As depicted in the back plan view 300, the eyepiece lens 304 is aligned with a left-side region 308 of the display area of the display device 108, while the eyepiece lens 306 is aligned with a right-side region 310 of the display area of the display device 108. Thus, in a stereoscopic display mode, imagery captured by the imaging camera 114 may be displayed in the left-side region 308 and viewed by the user's left eye via the eyepiece lens 304 and imagery captured by the imaging sensor 116 may be displayed in the right-side region 310 and viewed by the user's right eye via the eyepiece lens 306.

Figure 4:
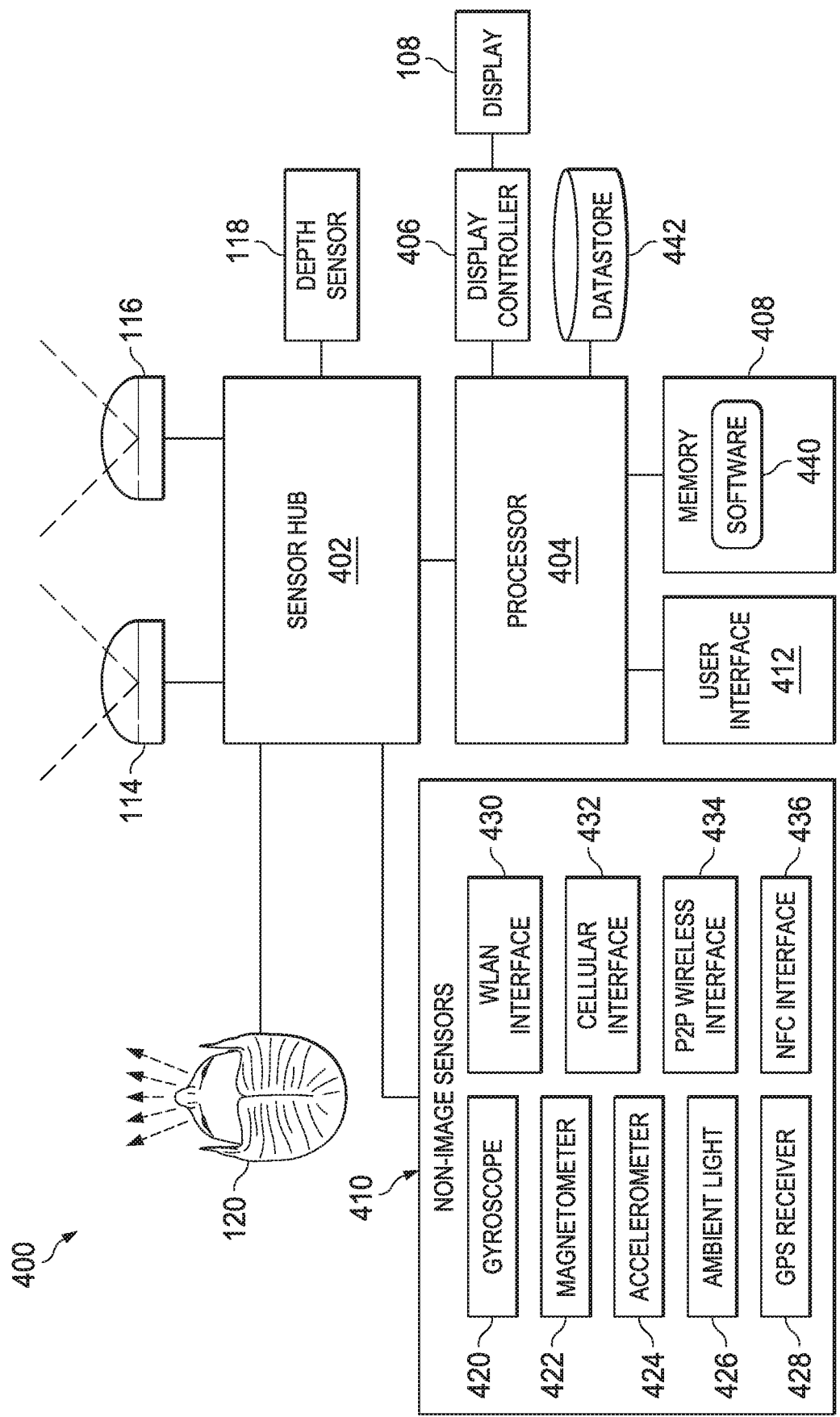
FIG. 4 illustrates an example processing system implemented by the electronic device in accordance with at least one embodiment of the present disclosure.

FIG. 4 illustrates an example processing system 400 implemented by the electronic device 100 in accordance with at least one embodiment of the present disclosure. The processing system 400 includes the display device 108, the imaging cameras 114, 116, and the depth sensor 118. The processing system 400 further includes a sensor hub 402, one or more processors 404 (e.g., a CPU, GPU, or combination thereof), a display controller 406, a system memory 408, a set 410 of non-image sensors, and a user interface 412. The user interface 412 includes one or more components manipulated by a user to provide user input to the electronic device 100, such as a touchscreen, a mouse, a keyboard, a microphone, various buttons or switches, and various haptic actuators. The set 410 of non-image sensors can include any of a variety of sensors used to provide non-image context or state of the electronic device 100. Examples of such sensors include a gyroscope 420, a magnetometer 422, an accelerometer 424, and an ambient light sensor 426. The non-image sensors further can include various wireless reception or transmission based sensors, such as a GPS receiver 428, a wireless local area network (WLAN) interface 430, a cellular interface 432, a peer-to-peer (P2P) wireless interface 434, and a near field communications (NFC) interface 436.

The electronic device 100 further has access to various datastores 442 storing information or metadata used in conjunction with its image processing, location mapping, and location-utilization processes. The datastores 442 can include a spatial feature datastore to store metadata for 2D or 3D spatial features identified from imagery captured by the imaging sensors of the electronic device 100, a SLAM datastore that stores SLAM-based information, such as mapping information for areas of the local environment 112 (FIG. 1) already explored by the electronic device 100, an AR/VR datastore that stores AR overlay information or VR information, such as representations of the relative locations of objects of interest in the local environment 112. The datastores may be local to the electronic device 100, such as on a hard drive, solid state memory, or removable storage medium (not shown), the datastores may be remotely located at one or more servers and accessible via, for example, one or more of the wireless interfaces of the electronic device 100, or the datastores may be implemented as a combination of local and remote data storage.

In operation, the imaging cameras 114, 116 capture imagery of a local environment, the compositor 402 processes the captured imagery to produce modified imagery, and the display controller 406 controls the display device 108 to display the modified imagery at the display device 108. Concurrently, the processor 404 executes one or more software programs 440 to provide various functionality in combination with the captured imagery, such spatial feature detection processes to detect spatial features in the captured imagery or in depth information captured by the depth sensor 118, the detection of the current pose of the electronic device 100 based on the detected spatial features or the non-sensor information provided by the set 410 of non-image sensors, the generation of AR overlays to be displayed in conjunction with the captured imagery, VR content to be displayed in addition to, or as a representation of the captured imagery, and the like. Examples of the operations performed by the electronic device 100 are described in greater detail below.

Figure 5A:
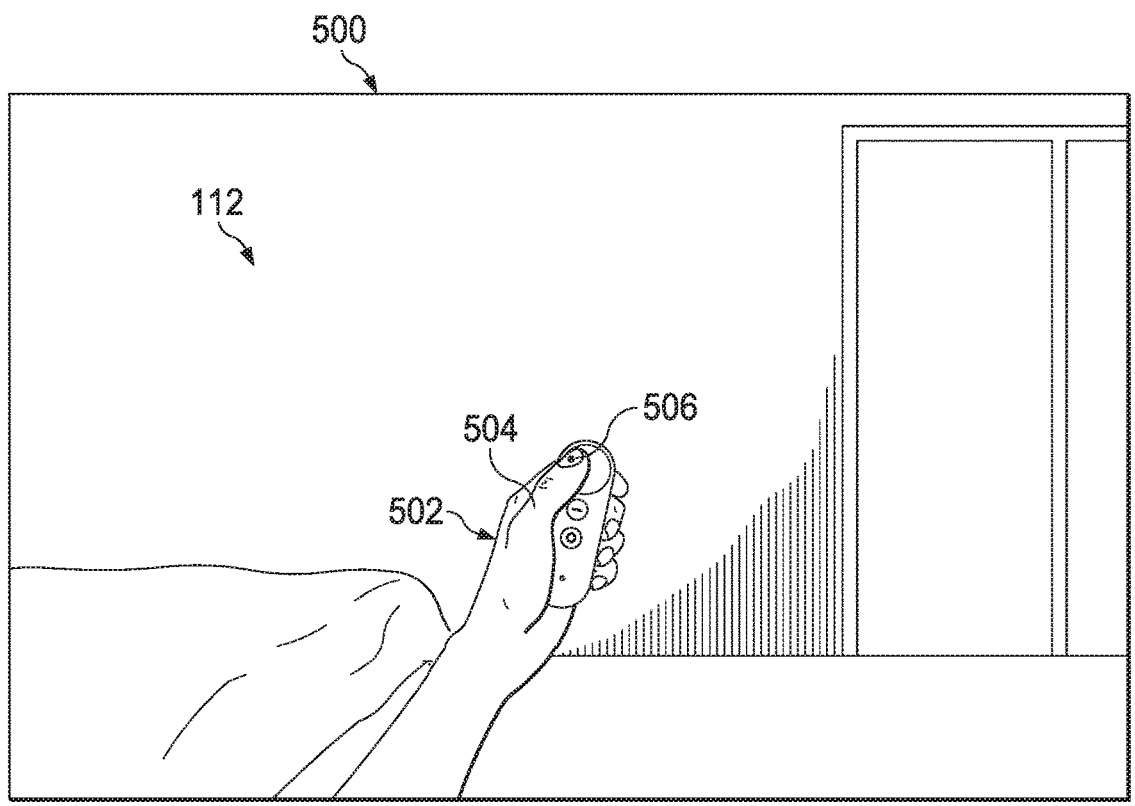
FIGS. 5A-5B are diagrams illustrating perspective views of an example implementation of controller tracking in accordance with at least one embodiment of the present disclosure.
Figure 5B:
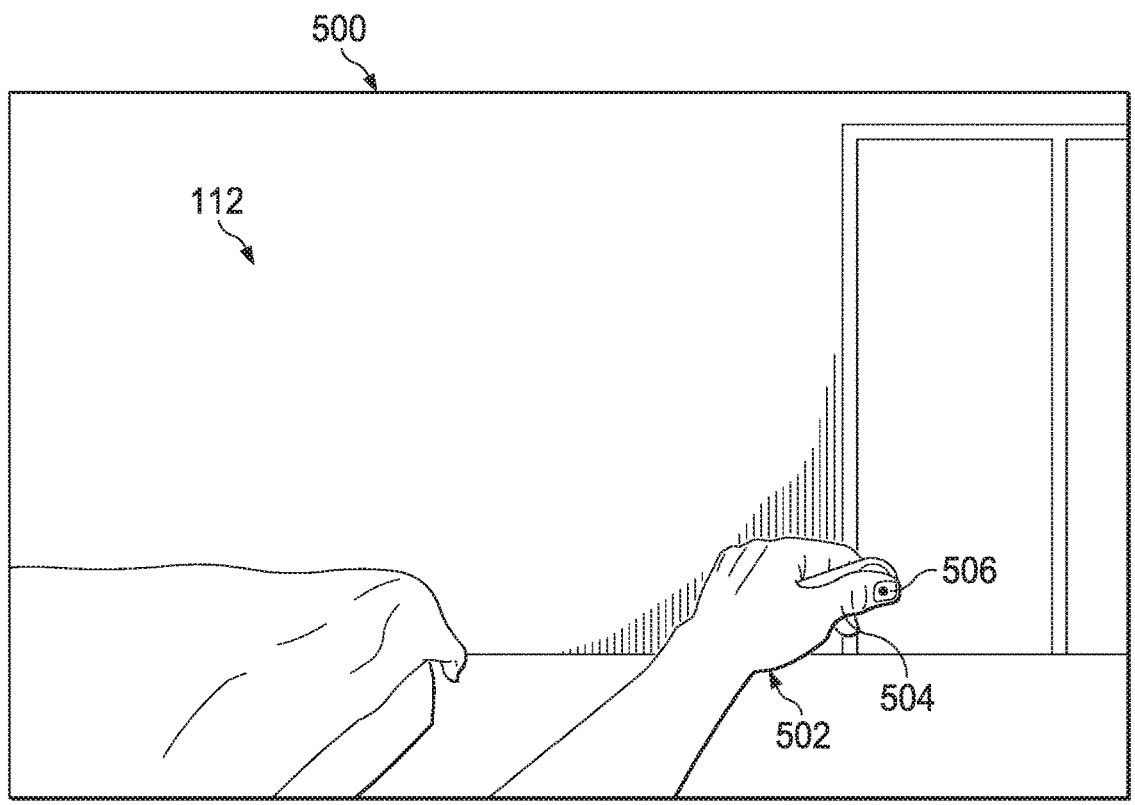

FIGS. 5A and 5B illustrate an example implementation of controller tracking in accordance with various embodiments of the present disclosure. FIGS. 5A-5B provide diagrams illustrating a perspective view 500 of the electronic device 100 looking out towards the local environment 112. As illustrated in FIG. 5A, the user 110 holds the hand-held controller 126 with a hand 502. In some embodiments, the electronic device 100 projects a modulated light pattern into the local environment 112 using depth sensor 118, which results in the reflection of light from objects in the local environment (e.g., the hand 502 and the hand-held controller 126). Because the depth, or distance, of a surface of an object from the electronic device 100 impacts the reflection of the projected light incident on the surface, the electronic device 100 can use a pattern distortion present in the reflection of the modulated light pattern to determine the depth of the object surface using any of a variety of well-known modulated light depth estimation techniques.

Alternatively, both of the forward-facing imaging cameras 114 and 116 can be used to capture the reflection of the projected modulated light pattern and multi-view image analysis can be performed on the parallel captured depth imagery to determine the depths of objects in the local environment. In other embodiments, the electronic device 100 can use one or both of the forward-facing imaging cameras 114 and 116 as time-of-flight imaging cameras synchronized to the projection of the modulated light pattern, whereby the electronic device 100 calculates the depths of objects in the captured reflections using any of a variety of well-known time-of-flight depth algorithms. As yet another example, the electronic device 100 can employ a high-speed exposure shutter imaging camera (either as one of the forward-facing imaging cameras 114 and 116 or as a separate forward-facing imaging camera) that captures reflected light from a pulse of infrared light or near-infrared light, whereby the amount of reflected pulse signal collected for each pixel of the sensor corresponds to where within the depth range the pulse was reflected from, and can thus be used to calculate the distance to a corresponding point on the subject object.

In one embodiment, the electronic device 100 uses depth information from the imaging cameras 114, 116 and depth sensor 118 to determine the relative pose between the electronic device and one or more anatomical features, markers, and/or gestures associated with the hand-held controller 126. In the example of FIG. 5, the electronic device 100 determines its pose relative to a thumb 504 of the hand 502. In particular, the electronic device 100 determines its pose by performing multi-view analysis of the image data 128 to determine the distance between the electronic device 100 and a fingernail 506 of the thumb 504. Alternatively, depth data obtained from the depth sensor 118 can be used to determine the distances of the fingernail 506 and/or the thumb 504. As another example, the electronic device can identify spatial features (i.e., anatomical features, markers, and/or gestures associated with the hand-held controller 126) present in one set of captured image frames of the image data, determine the distances to these spatial features, and then track the changes in position and distances of these spatial features in subsequent captured imagery to determine the change in pose of the hand-held controller 126 relative to the electronic device 100. Accordingly, the electronic device uses depth information to determine regarding the fingernail's and/or the thumb's position in 3D space. This 3DoF positional information includes tracking of forward/backward, up/down, and left/right translation of the user's thumb (and therefore the controller 126 held by the hand 502) along three perpendicular axes in 3D space.

Additionally, the electronic device 100 receives non-image sensor data, such as gyroscopic data, accelerometer data, and/or IMU data, from the controller 126. For example, the controller 126 can include sensors such as gyroscopes, altimeters, and IMUS so as to capture 3DoF readings for enabling detection of the relative pose of the controller 126. In particular, the electronic device 100 receives rotational information indicating rotational movement of the controller 126 as the user moves, for example, his hand 502. This rotational information includes 3DoF tracking of changes of yaw, pitch, and roll of the controller 126, representing rotation about three perpendicular axes in 3D space. In various embodiments, the electronic device 100 combines the 3DoF positional information captured by the electronic device and the 3DoF rotational information captured by the controller 126, thereby achieving 6DoF tracking of the hand-held controller 126.

The electronic device 100 uses the 3DoF positional information and 3DoF rotational information to correlate changes in position and orientation of spatial features (e.g., anatomical features such as the thumb 504 or thumbnail 506, markers, and/or gestures) observed in one image frame with spatial features observed in a subsequent image frame, such as in FIGS. 5A-5B. Accordingly, the electronic device 100 performs 6DoF tracking of the controller 126 based on positional information provided by the captured depth information (or in some embodiments, captured image- and non-image sensor data) and rotational movement information provided by the controller 126, thereby extending 6DoF tracking to 3DoF controllers without the need for inclusion of additional sensors in the controller 126.

Figure 6:
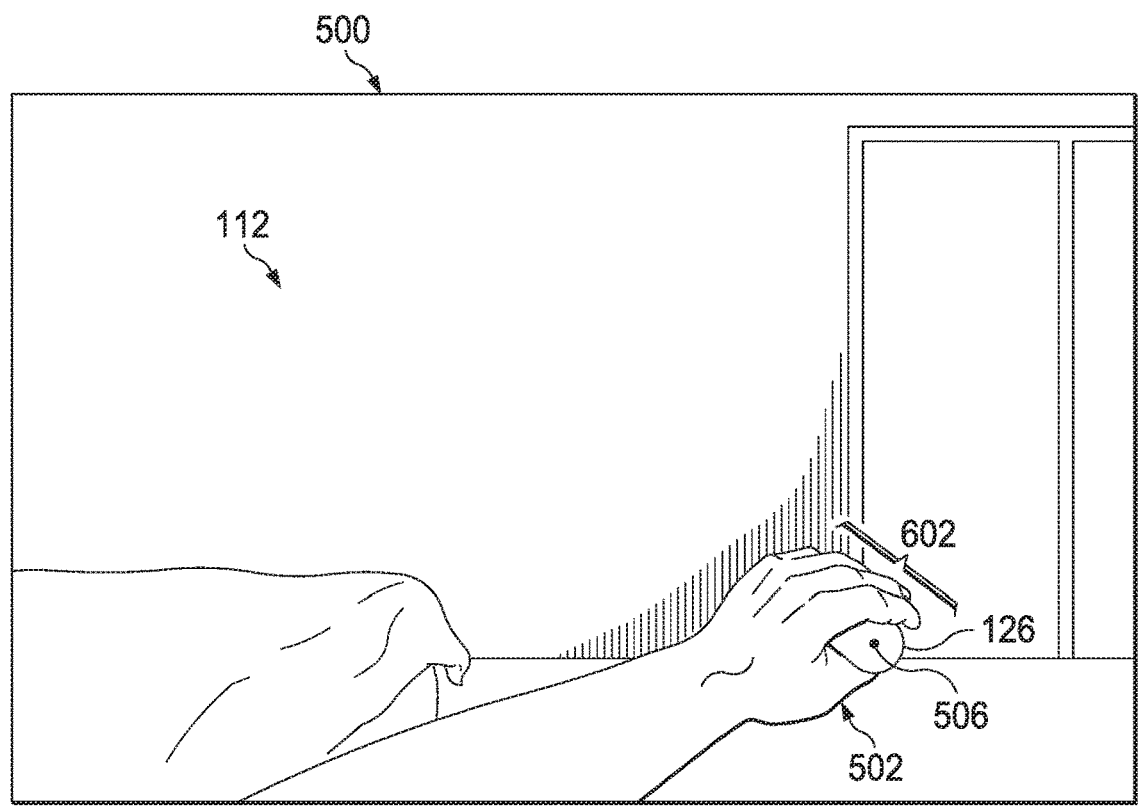
FIG. 6. is a diagram illustrating a perspective view of another example implementation of controller tracking in accordance with at least one embodiment of the present disclosure.

Although the example of FIGS. 5A-5B illustrates controller tracking using a single anatomical feature associated with the controller 126, those skilled in the art will recognize that the controller tracking may be performed using any combination of spatial features (i.e., anatomical features, markers, and/or gestures) associated with the hand-held controller 126. FIG. 6 is a perspective view 600 of the electronic device 100 looking out towards the local environment 112. As illustrated in FIG. 6, the user 110 holds the hand-held controller 126 with a hand 502. However, in contrast to the example perspective views 500 of FIGS. 5A-5B, the thumb 504 and the thumbnail 506 are not visible to the electronic device 100. Accordingly, the electronic device 100 performs 6DoF tracking of the controller 126 based on a correlation of the position of the thumbnail 506 (and therefore the position of the controller 126 held by the hand 502) relative to a grasp pattern 602 of the fingers and/or an orientation of the controller 126. For example, based on the image frame as represented by the perspective view of FIG. 5B, the electronic device 100 determines a grasp pattern in which the fingers of the hand 502 are wrapped around the controller 126 in approximately a "thumbs up" configuration. Accordingly, in the example of FIG. 6, the electronic device 100 infers the position of the thumbnail 506 (and therefore the position and orientation in 3D space of the controller 126 held by the hand 502) based on the grasp pattern 602 of the fingers.

Figure 7:
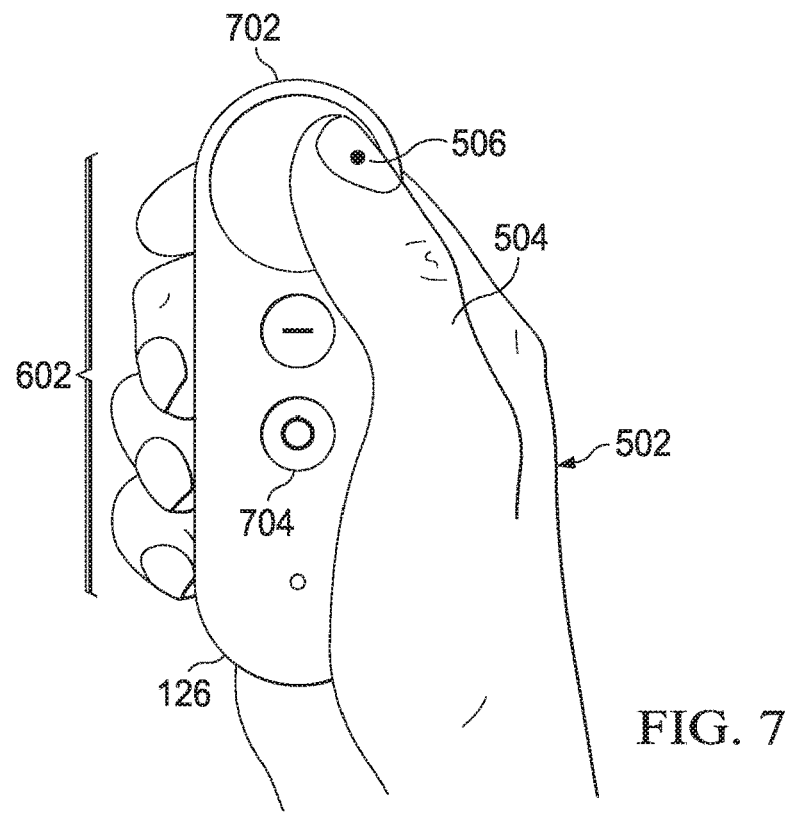
FIG. 7 is a diagram illustrating a perspective view of yet another example implementation of controller tracking in accordance with at least one embodiment of the present disclosure.

In another embodiment, the electronic device 100 performs controller tracking based on markers or other spatial features associated with the controller 126. For example, FIG. 7 is a perspective view 700 of the electronic device 100 looking out towards the local environment 112. As illustrated in FIG. 7, the user 110 holds the hand-held controller 126 with a hand 502. The electronic device 100 determines its pose relative to one or more of a touchpad 702, a button 704 of the controller 126, and the like. In particular, the electronic device 100 determines its pose by performing multi-view analysis of the image data 128 to determine the distance between the electronic device 100 and the thumb 504 and/or the thumbnail 506. Additionally, the electronic device 100 further receives touchpad data representing a portion of the touchpad 702 that is in contact with the user's thumb. For example, in the example of FIG. 7, the electronic device 100 receives coordinates representing contact by the thumb 504 at a right of center position of the touchpad 702. As the thumb 504 moves around on controller's touchpad 702, the electronic device 100 compensates for an offset between the thumb's location and the controller's center axis. Accordingly, the thumb contact position as provided by the touchpad data is used by the electronic device 100 to refine its thumb-position based controller tracking, such as described above relative to FIGS. 5A-5B.

In other embodiments, the electronic device 100 determines its pose by performing multi-view analysis of the image data 128 to determine the distance between the electronic device 100 and visible surface markings (e.g., button 704) or other spatial features of the controller 126. Alternatively, depth data obtained from the depth sensor 118 can be used to determine the distances of the button 704. Accordingly, the electronic device uses depth information to determine the button's position in 3D space. This 3DoF positional information includes tracking of forward/backward, up/down, and left/right translation of the button 704 (and therefore the controller 126 held by the hand 502) along three perpendicular axes in 3D space. Those skilled in the art will recognize that the pose of the electronic device 100 relative to the controller 126 is not limited to the embodiments described herein. Various other features and attributes of the controller 126 may be tracked using image and depth data to capture positional information of the controller 126 without departing from the scope of this disclosure. For example, it will be appreciated that visible surface text, physical dimensions and geometry of the controller, other anatomical features of the hand, gestures provided by anatomical features of the hand, and any combination of the like may be used to capture 3DoF positional information.

Figure 8:
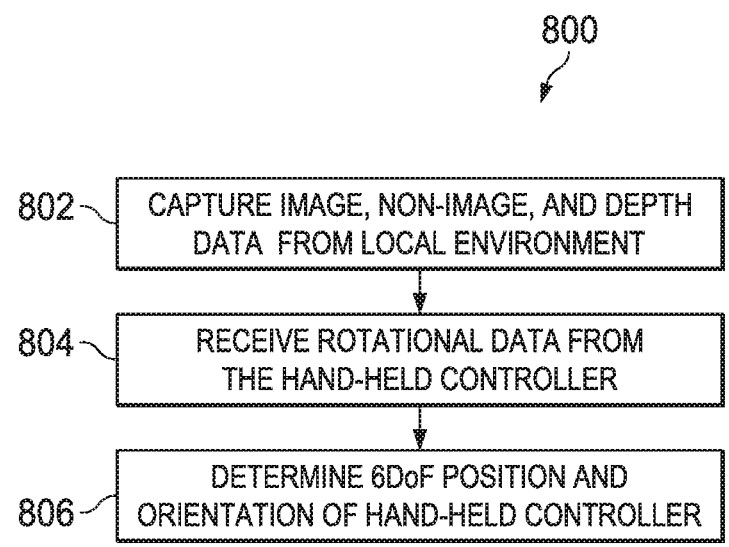
FIG. 8 is a flow chart illustrating a method for controller tracking in accordance with at least one embodiment of the present disclosure.

FIG. 8 an example method 800 of operation of the electronic device 100 for 6DoF controller tracking in accordance with at least one embodiment of the present disclosure. For ease of illustration, the method 800 is depicted and generally described as a single loop of operations that can be performed multiple times. It is understood that the steps of the depicted flowchart of FIG. 8 can be performed in any order, and certain ones can be eliminated, and/or certain other ones can be added or repeated depending upon the implementation.

An iteration of method 800 initiates with the capture of various image sensor data, non-image sensor data, and depth data at block 802. In one embodiment, the capture of the sensor data is triggered by, or otherwise synchronized to, the capture of concurrent image frames by one or more of the imaging cameras 114, 116, and depth sensor 118 (FIG. 1) of the electronic device 100. In other embodiments, various sensor data may be periodically or otherwise repeatedly obtained and then synchronized to captured image data using timestamps or other synchronization metadata. This capture of sensor data can include the capture of wide angle view image data for the local environment 112 (FIG. 1) via the wide-angle imaging camera 114 at block 802 and the capture of narrow angle view image data for the local environment 112 via the narrow-angle imaging camera 116. Further, in the event that the depth sensor 118 is activated, depth data for the local environment can be captured via the depth sensor 118. Furthermore, head tracking data representing the current position of the user's head 120 can be obtained from a user-facing imaging camera.

The various image sensor data, non-image sensor data, and depth data captured from block 802 is used by the electronic device 100 to generate a mapping of the local environment surrounding the electronic device 100. As described above, the depth sensor relies on the projection of a modulated light pattern, or a "modulated light flash," by the modulated light projector 124 into the local environment and on the capture of the reflection of the modulated light pattern therefrom by one or more of the imaging cameras. Thus, the HMD (i.e., electronic device 100 as illustrated in FIGS. 1-3) worn by the user may use one or both of the forward-facing imaging cameras 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding spatial feature, the HMD can perform a spatial feature analysis on the depth imagery to determine a spatial feature and its relative depth, and then attempt to match the spatial feature to a corresponding spatial feature identified in the visual-light imagery captured at or near the same time as the reflected modulated light imagery was captured. In another embodiment, the HMD can capture a visible-light image, and thereafter control the modulated light projector to project a modulated light pattern and capture a reflected modulated light image. The HMD then can develop a depth map for the visible-light image from the reflected modulated light image as they effectively represent the same scene with the same spatial features at the same coordinates due to the contemporaneous capture of the visible-light image and the reflected modulated light image. In some embodiments, generating the mapping includes capturing 3DoF positional information and determining the pose of the electronic device 100 relative to spatial features associated with the controller 126. For example, as discussed in more detail relative to FIGS. 5A-7, the spatial features associated with the controller include anatomical features such as the thumb 504 or thumbnail 506, markers, gestures, and the like.

At block 804, the electronic device 100 receives rotational information from the hand-held controller that indicates rotational movement of the controller 126 as the user moves, for example, his hand 502. This rotational information includes 3DoF tracking of changes of yaw, pitch, and roll of the controller 126, representing rotation about three perpendicular axes in 3D space. In some embodiments, the rotational information includes data from sensors of the controller, such as gyroscopes and altimeters that capture three-degrees-of-freedom (3DoF) readings. In other embodiments, rotational information includes IMU data that capture, for example, 3DoF data indicative of real world linear acceleration of movement, orientation and gravitational forces based on devices of the IMU such as, without limitation, accelerometers and gyroscopes.

At block 806, the electronic device determines the 6DoF position and orientation of the controller 126 based on the positional and rotational information of blocks 802 and 804. The electronic device 100 combines the 3DoF positional information captured by the electronic device and the 3DoF rotational information captured by the controller 126, thereby achieving 6DoF tracking of the hand-held controller 126. In various embodiments, the electronic device 100 uses the 3DoF positional information and 3DoF rotational information to correlate changes in position and orientation of spatial features (e.g., anatomical features such as the thumb 504 or thumbnail 506, markers, and/or gestures) observed in one image frame with spatial features observed in a subsequent image frame, such as described in more detail with respect to FIGS. 5A-7. The 6DoF controller tracking of block 806 may be performed using any combination of spatial features (i.e., anatomical features, markers, and/or gestures) associated with the hand-held controller 126. Accordingly, the electronic device 100 performs 6DoF tracking of the controller 126 based on positional information provided by the captured depth information (or in some embodiments, captured image-and non-image sensor data) and rotational movement information provided by the controller 126, thereby extending 6DoF tracking to 3DoF controllers without the need for inclusion of additional sensors in the controller 126.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The various embodiments of the present disclosure illustrate the implementation of a fault detection system that enables quick error detection and recovery to enable a more stable motion tracking. The system includes at least four subdetector modules that are running simultaneously. When any one of the four subdetectors in the system detects an error, a fault is triggered in the system. The system may then quickly recover and reinitialize for continued motion tracking.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
generating depth data based on images of a reflection of a modulated light pattern captured at an electronic device of a local environment proximate the electronic device, the depth data comprising data corresponding to distances of spatial features of objects in the local environment from the electronic device;
determining a pose of the electronic device based on the depth data;
generating, based on the pose of the electronic device relative to at least one spatial feature comprising anatomical features or gestures associated with a controller, a set of positional data representing three degrees-of-freedom (3DoF) translation of the controller within the local environment;
receiving a set of rotational data representing 3DoF orientation of the controller within the local environment;
tracking a six degrees-of-freedom (6DoF) position of the controller within the local environment based on the set of positional data and the set of rotational data;
receiving a set of touchpad information from the controller, wherein the set of touchpad information includes a contact position of a thumb of a user's hand on a touchpad of the controller;
determining an offset of the contact position from a center axis of the touchpad; and
refining the 6DoF position of the controller based on a corrected pose of the electronic device relative to the thumb position, wherein the corrected pose accounts for the offset of the contact position.

2. The method of claim 1, further comprising:
projecting, at the electronic device, the modulated light pattern into the local environment.

3. The method of claim 1, further comprising:
identifying a position of the user's hand, wherein the at least one spatial feature includes a thumb position of the user's hand; and
determining the 6DoF position of the controller based on the pose of the electronic device relative to the thumb position.

4. The method of claim 3, further comprising:
identifying a grasp pattern of the user's hand, wherein the at least one spatial feature further includes an identified relationship between the thumb position and the grasp pattern; and
determining the 6DoF position of the controller based on the pose of the electronic device relative to the identified relationship between the thumb position and the grasp pattern.

5. The method of claim 4, further comprising:
determining, based on the identified relationship between the thumb position and the grasp pattern, an inferred thumb position when a thumb of the user's hand is not visible to the electronic device.

6. The method of claim 1, further comprising:
identifying a position of a visible marking on a surface of the controller; and
determining the 6DoF position of the controller based on the pose of the electronic device relative to the visible marking.

7. A system for performing controller tracking, comprising:

a depth sensor to capture, at an electronic device, images of a reflection of a modulated light pattern and to generate depth data from a local environment proximate the electronic device based on the images, the depth data comprising data corresponding to distances of spatial features of objects in the local environment from the electronic device;

a hand-held controller including a touchpad configured to detect a contact position of a user's thumb; and a processor to:
    determine a pose of the electronic device based on the depth data;
    generate a set of positional data representing three degrees-of-freedom (3DoF) translation of the hand-held controller within the local environment based on the pose of the electronic device relative to at least one spatial feature associated with the hand-held controller;
    receive a set of rotational data representing a 3DoF orientation of the hand-held controller within the local environment;
    track a 6DoF position of the hand-held controller within the local environment based on the set of positional data and the set of rotational data;
    determine an offset of the contact position from a center axis of the touchpad; and
    determine the 6DoF position of the hand-held controller based on a corrected pose of the electronic device that accounts for the offset of the contact position.

8. The system of claim 7, wherein the electronic device comprises a projector to project the modulated light pattern into the local environment.

9. The system of claim 7, wherein the hand-held controller includes an inertial measurement unit (IMU) configured to capture 3DoF rotational orientation data.

10. The system of claim 7, wherein:
    the processor is to determine a position of a visible marking on a surface of the controller, and further wherein the processor is to track the 6DoF position of the controller based at least on the pose of the electronic device relative to the visible marking.

11. A non-transitory computer readable medium having stored therein instructions, which when executed by a processor, perform operations comprising:
    generating depth data based on images of a reflection of a modulated light pattern captured at an electronic device of a local environment proximate the electronic device, the depth data comprising data corresponding to distances of spatial features of objects in the local environment from the electronic device;
    determining a pose of the electronic device based on the depth data;
    generating, based on the pose of the electronic device relative to at least one spatial feature associated with a controller, a set of positional data representing three degrees-of-freedom (3DoF) translation of the controller within the local environment;
    receiving a set of rotational data representing 3DoF orientation of the controller within the local environment;
    tracking a six degrees-of-freedom (6DoF) position of the controller within the local environment based on the set of positional data and the set of rotational data;
    receiving a set of touchpad information from the controller, wherein the set of touchpad information includes a contact position of a thumb of a user's hand on a touchpad of the controller; and
    determining the 6DoF position of the controller based on a corrected pose of the electronic device relative to the thumb contact position, wherein the corrected pose accounts for an offset of the contact position from a center axis of the touchpad.

12. The non-transitory computer readable medium of claim 11, the instructions, which when executed by a processor, further perform operations comprising:
    identifying a position of the user's hand, wherein the at least one spatial feature includes a thumb position of the user's hand; and
    determining the 6DoF position of the controller based on the pose of the electronic device relative to the thumb position.

13. The non-transitory computer readable medium of claim 12, the instructions, which when executed by a processor, further perform operations comprising:
    identifying a grasp pattern of the user's hand, wherein the at least one spatial feature further includes an identified relationship between the thumb position and the grasp pattern; and
    determining the 6DoF position of the controller based on the pose of the electronic device relative to the identified relationship between the thumb position and the grasp pattern.

14. The non-transitory computer readable medium of claim 13, the instructions, which when executed by a processor, further perform operations comprising:
    determining, based on the identified relationship between the thumb position and the grasp pattern, an inferred thumb position when a thumb of the user's hand is not visible to the electronic device.

15. The non-transitory computer readable medium of claim 11, the instructions, which when executed by a processor, further perform operations comprising:
    projecting the modulated light pattern into the local environment.

* * * * *